United States Patent
Ha et al.

(10) Patent No.: US 7,853,662 B2
(45) Date of Patent: Dec. 14, 2010

(54) NETWORK CONTROL SYSTEM FOR HOME APPLIANCES

(75) Inventors: Sam-Chul Ha, Changwon-shi (KR); Seung-Myun Baek, Changwon-shi (KR); Koon-Seok Lee, Changwon-shi (KR); Jeong-Hyun Lim, Kimhae-shi (KR); Hwan-Jong Choi, Changwon-shi (KR); Ja-In Koo, Jinju-shi (KR); Dae-Woong Kim, Changwon-shi (KR); Sung-Hwan Kang, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 1068 days.

(21) Appl. No.: 10/478,816

(22) PCT Filed: Jul. 5, 2001

(86) PCT No.: PCT/KR01/01151

§ 371 (c)(1),
(2), (4) Date: Nov. 26, 2003

(87) PCT Pub. No.: WO02/097555

PCT Pub. Date: Dec. 5, 2002

(65) Prior Publication Data

US 2004/0158333 A1    Aug. 12, 2004

(30) Foreign Application Priority Data

May 30, 2001    (KR) ................ 10-2001-0030036

(51) Int. Cl.
G06F 15/16    (2006.01)
G06F 15/173    (2006.01)
(52) U.S. Cl. .................. 709/208; 709/223; 709/227
(58) Field of Classification Search .............. 709/208, 709/223, 224, 227, 228
See application file for complete search history.

(56) References Cited

U.S. PATENT DOCUMENTS 4,638,313 A    1/1987    Sherwood, Jr. et al.

(Continued)

FOREIGN PATENT DOCUMENTS

| CN | 85108163 | 10/1986 |
|---|---|---|
| CN | 1190838 | 8/1998 |
| EP | 0969628 A2 | 1/2000 |
| EP | 1026580 A2 | 8/2000 |
| EP | 1098475 A1 | 5/2001 |
| EP | 1115263 A1 * | 7/2001 |
| JP | 60083447 | 5/1985 |
| JP | 10341289 | 12/1998 |
| JP | 2000184471 | 6/2000 |
| WO | WO 00/04427 | 1/2000 |

OTHER PUBLICATIONS

International Search Report; Austrian Patent Office; Dec. 20, 2002.

*Primary Examiner*—Asad M Nawaz
*Assistant Examiner*—Farzana Huq
(74) *Attorney, Agent, or Firm*—McKenna Long & Aldridge LLP

(57) ABSTRACT

Disclosed is a network control system for home appliances that satisfies the characteristics of low-cost and high-efficiency with respect to currently used appliances adopting a low-performance microcomputer. The system is constructed to define a master/slave type communication structure with respect to the respective appliances; construct a network by connecting the appliances through the serial communication function; and enable the appliances to communicate with one another if a predetermined communication event is produced. According to the system, an optimized network for the home appliances can be implemented, and operation states of the respective appliances can be displayed through the co-operation among the appliances, thereby maximizing the user convenience.

14 Claims, 11 Drawing Sheets

U.S. PATENT DOCUMENTS

| | | | |
|---|---|---|---|
| 4,703,306 A | 10/1987 | Barritt | |
| 5,235,685 A | 8/1993 | Caldara et al. | |
| 5,255,185 A | 10/1993 | Mowers et al. | |
| 5,309,567 A | 5/1994 | Mizukami et al. | |
| 5,319,755 A | 6/1994 | Farmwald et al. | |
| 5,600,310 A | 2/1997 | Whipple et al. | |
| 5,621,662 A * | 4/1997 | Humphries et al. | 700/276 |
| 5,751,970 A | 5/1998 | Bournas | |
| 5,877,957 A * | 3/1999 | Bennett | 700/86 |
| 5,922,050 A | 7/1999 | Madany | |
| 5,938,757 A * | 8/1999 | Bertsch | 712/36 |
| 6,006,272 A | 12/1999 | Aravamudan et al. | |
| 6,018,816 A | 1/2000 | Tateyama | |
| 6,098,188 A | 8/2000 | Kalmanek, Jr. et al. | |
| 6,108,718 A | 8/2000 | Fujimori et al. | |
| 6,134,245 A | 10/2000 | Scarmalis | |
| 6,160,808 A | 12/2000 | Maurya | |
| 6,167,046 A | 12/2000 | Terada et al. | |
| 6,182,094 B1 | 1/2001 | Humpleman et al. | |
| 6,425,019 B1 | 7/2002 | Tateyama et al. | |
| 6,584,096 B1 | 6/2003 | Allan | |
| 6,658,474 B2 | 12/2003 | Kang | |
| 6,735,619 B1 * | 5/2004 | Sawada | 709/212 |
| 6,785,258 B1 | 8/2004 | Garcia, Jr. et al. | |
| 6,785,720 B1 | 8/2004 | Seong | |
| 6,831,912 B1 | 12/2004 | Sherman | |
| 6,956,818 B1 | 10/2005 | Thodiyil | |
| 6,956,819 B1 * | 10/2005 | Yamada et al. | 370/230 |
| 6,965,646 B1 | 11/2005 | Firestone | |
| 7,103,834 B1 * | 9/2006 | Humpleman et al. | 715/501.1 |
| 2002/0027886 A1 * | 3/2002 | Fischer et al. | 370/255 |
| 2002/0091812 A1 * | 7/2002 | Ando et al. | 709/223 |
| 2002/0103898 A1 | 8/2002 | Moyer et al. | |
| 2003/0065407 A1 | 4/2003 | Johnson | |
| 2003/0149757 A1 * | 8/2003 | Ueno et al. | 709/223 |
| 2003/0219030 A1 * | 11/2003 | Gubbi | 370/442 |
| 2005/0152365 A1 | 7/2005 | Yazaki et al. | |

* cited by examiner

| HC | RA | SA | PL | AP | PHL | PV | PT | RC | PN | ML | MHL | PO | CC | ACK NAK | ARG | CRC | ETX |
|----|----|----|----|----|-----|----|----|----|----|----|-----|----|----|---------|-----|-----|-----|
| 8  | 16 | 16 | 8  | 3  | 5   | 8  | 4  | 2  | 2  | 8  | 8   | 8  | 8  | 8       | V   | 16  | 8   |

Output Arguments (ACK NAK, ARG, CRC, ETX)

FIG.15

| Code | Network |
|---|---|
| 0 | Living Network: White Goods,Lamp,Security Device, Health Product,..... |
| 1 | TV Network: TV,Audio,Video,..... |
| 2 | PC Network: PC,Printer,Scanner,FAX,..... |
| 3~6 | Reserved |
| 7 | Group Addressing |

FIG.16

| Address | Group |
|---|---|
| 0x1FFF | All Products Of Living Network |
| 0xXXFF | All Products Whose Product Code Is 0xXX |
| 0xFFFF | All Products Of Home Network |

FIG.17

| Address | Group |
|---|---|
| 0x1F00 | All Products Installed In Places Whose Code Is "0" Among Living Products (Initial Place Group Address When Sending Out) |
| 0x1F01 | All Products Installed In Places Whose Code Is "1" Among Living Products |

FIG.18

| Address | Group |
|---|---|
| 0xE200 | All Products Whose Product Code Is 0x02 And Which Are Installed In Places Whose Code Is "0"(Initial Place Group Address When Sending Out) |
| 0xE301 | All Products Whose Product Code Is 0x03 And Which Are Installed In Places Whose Code Is "1" |

FIG.19

["Event File"Header Structure]

| | |
|---|---|
| Total Number Of Event Codes | 1Byte |
| Event Code 1 To Be Executed | 1Byte |
| Event Code 2 To Be Executed | 1Byte |
| ⋮ | ⋮ |
| Memory Address Storing Data Event Code 1 | 4Byte |
| Memory Address Storing Data Event Code 2 | 1Byte |
| ⋮ | ⋮ |

FIG.20

["Event File" Body Structure]

| Address Subject To Communication | Event Occurrence interval(Sec) | Priority | Packet Type | Action Message | | |
|---|---|---|---|---|---|---|
| | | | | Message Header | Command Code | Arguments |
| 2Bytes | 2Bytes | 1Byte | 1Byte | Variable | | |

FIG.21

| Packet Header | Message Header | Command Code Copy | 0x15 | Error Code | CRC | 0X03 |
|---|---|---|---|---|---|---|

NETWORK CONTROL SYSTEM FOR HOME APPLIANCES

TECHNICAL FIELD

The present invention relates to a network control apparatus and method, and more particularly to a network control system for home appliances.

BACKGROUND ART

Currently, the home automation for automatically controlling home appliances at home or at a remote place has been almost commercialized. In case of the initial-stage home automation, the respective appliances are separately controlled using telephones or infrared rays without interconnection between the appliances. At present, a network is constructed among the appliances using a communication means, and a controller for controlling the network is provided to manage the appliances in integration.

Microcomputers applied to the appliances have a built-in serial communication function, and can communicate with other microcomputers or appliances. This microcomputer has diverse sizes of resources that can be used in communications such as a memory according to the characteristic of the appliance. In case of multimedia products such as personal computers (PCs), television receivers (TVs), audio appliances, etc., high-performance hardware specifications are adopted to operate diverse basic functions, and the communication standard for processing a large amount of data at a high speed is required.

On the contrary, in case of refrigerators, washing machines, microwave ovens, lamps, gas alarms, desk lamps, boilers, etc., their functions are very simple in comparison to the above-mentioned PCs or multimedia products, and thus a low-performance microcomputer of 8 bits or less is generally used. In case of the home appliances adopting the low-performance microcomputer, the basic remote control or monitoring of the operation state is the main object of the communications, and thus the communication standard using small-sized microcomputer resources is required.

However, in case of the communication protocols being currently used or proceeding for the purpose of communications between the appliances, separate communication modules such as modems are additionally installed in the respective appliances in order to use the high-performance communication standard applied to the PCs or multimedia appliances as it is, or the high-performance communication standard is partially modified.

The conventional home appliances adopt the high-performance communication standard used in the PCs or multimedia appliances, and thus have the problems of inefficiency and increase of cost due to the adoption of the unnecessary communication standard higher than their actual functions since a separate hardware communication module such as a modem is to be additionally installed in each appliance.

DISCLOSURE OF THE INVENTION

Therefore, an object of the present invention is to solve the problems involved in the prior art and to provide a network control system for home appliances that satisfies the characteristics of low-cost and high-efficiency with respect to the currently used appliances adopting a low-performance microcomputer.

In order to accomplish the above-mentioned object, the present invention provides a network control system for home appliances provided with a low-performance microcomputer having a serial communication function that defines a master/slave type communication structure with respect to the respective appliances; determines a communication standard composed of an application layer, data link layer, and physical layer according to the communication structure; constructs a network by connecting the appliances through the serial communication function; and enables the appliances to communicate with one another in the unit of a specified packet according to the communication structure and communication standard if a predetermined communication event is produced.

BRIEF DESCRIPTION OF THE DRAWINGS

The above object, other features and advantages of the present invention will become more apparent by describing the preferred embodiment thereof with reference to the accompanying drawings, in which:

FIG. 15 is a view illustrating a network code division method.

FIG. 16 is a view illustrating a group address according to a kind of a product.

FIG. 17 is a view illustrating a group address according to an installed place.

FIG. 18 is a view illustrating a group address according to an installed place and kind of product.

FIG. 19 is a view illustrating a header structure of an event file.

FIG. 20 is a view illustrating a body structure of an event file.

FIG. 21 is a view illustrating the construction of a response packet when an error is produced.

BEST MODE FOR CARRYING OUT THE INVENTION

Now, the network control system for home appliances according to preferred embodiments of the present invention will be described in detail with reference to the annexed drawings.

Figure 1:
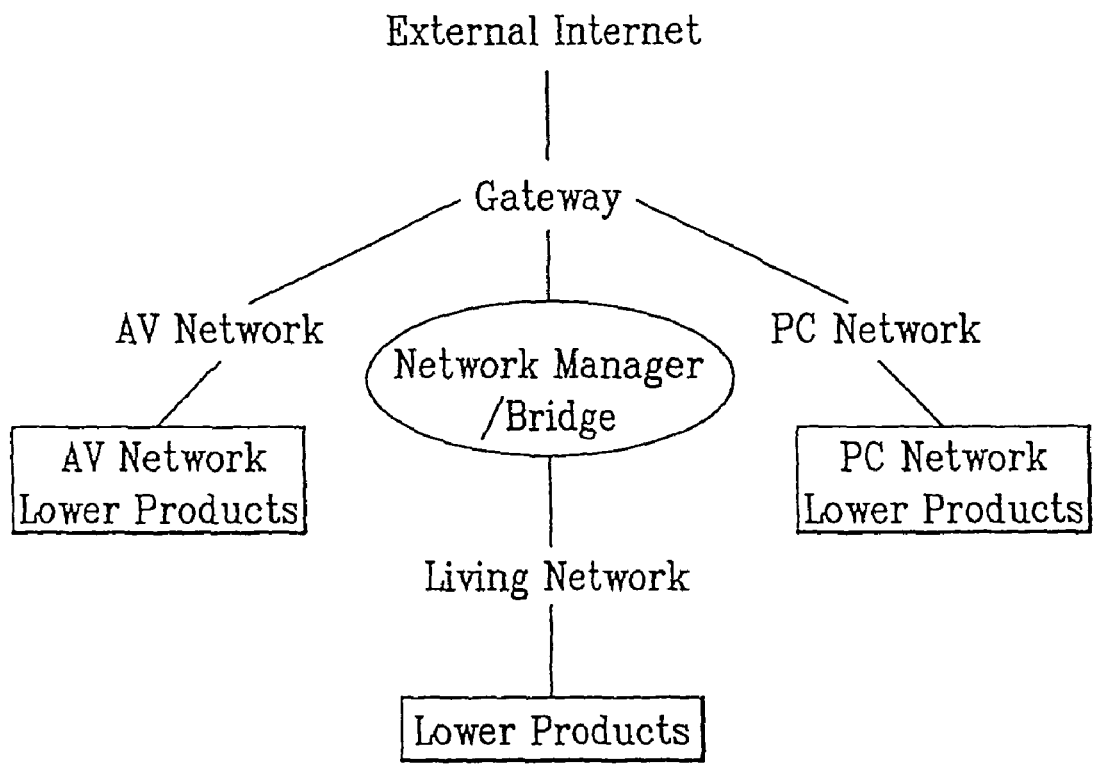
FIG. 1 is a view illustrating a network of home appliances.

First, as shown in FIG. 1, the network according to the present invention may comprise multimedia appliances such as a television receiver (TV), audio appliance, etc., connected to an audio/video (A/V) network through a gateway connected to an external Internet; PC lower appliances such as a printer, scanner, PC camera, etc., connected to a personal computer (PC) network; and lower appliances such as a refrigerator, air conditioner, washing machine, cleaner, microwave oven, humidifier, lamp, desk lamp, gas alarm, etc., connected to a living network through a network manager.

The network control system for home appliances according to the present invention will now be explained.

The present invention adopts a master/slave system. That is, all the communication cycles start from a master, and end with a master device. Any appliance may be the master, but for this, it should have a function of controlling the data flow on communication lines, information on appliances connected to a network, and a control code. According to the present invention applied to the network among the home appliances of relatively low-performance specifications, only a device having a user interface function such as a PC carries all functions of the master, and other devices serve only as the masters having limited functions such as communication with a predetermined slave or communication using a simple control code.

Figure 2:
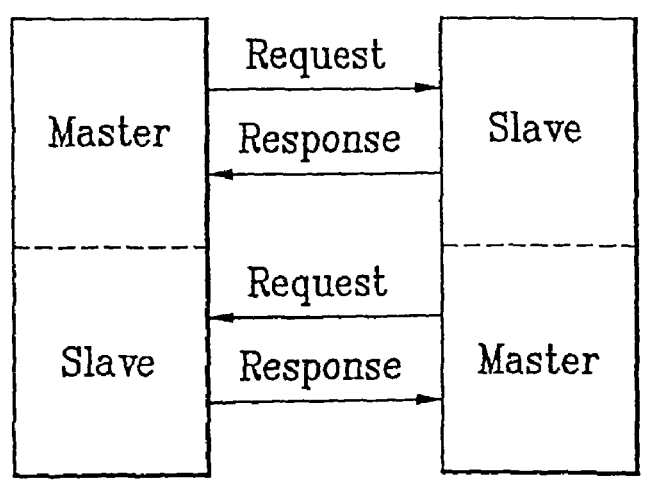
FIG. 2 is a view illustrating a communication structure between master/slave type appliances according to the present invention.

Also, the present invention defines a device in which the master and the slave coexist logically so that a direct communication between devices, i.e., peer-to-peer communication, is possible while maintaining the basic master/slave communication system. That is, a shown in FIG. 2, a device (hereinafter, referred to as P2P device) that is one physical device, but is logically divided into an independent master and slave is defined.

Figure 3:
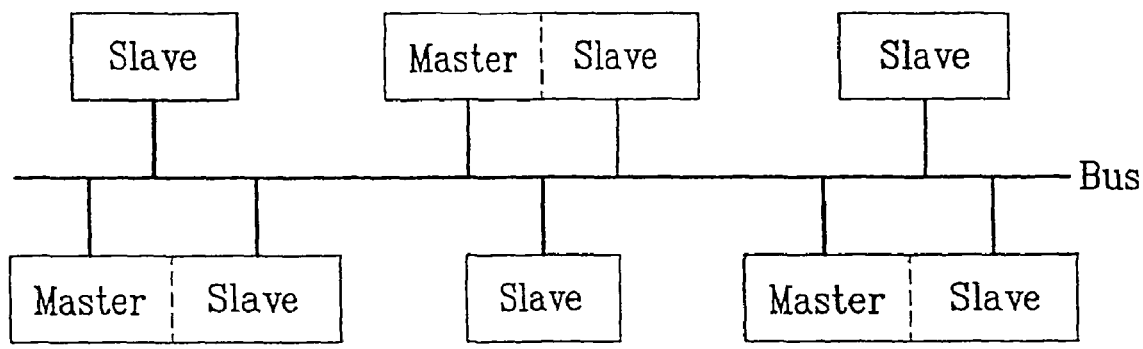
FIG. 3 is a view illustrating a detailed construction of a master/slave type communication structure according to the present invention.

All products connected to the network are basically the P2P devices, but as shown in FIG. 3, they may be defined as the master, slave, dedicated sender, and dedicated receiver according to the hardware characteristics of the products.

Specifically, in case of the master, in order to start a new communication cycle, the master functions to start and end the communication with the corresponding slave if an event of communication start is produced by the last user or due to the internal state change of the device.

In case of the slave, it is always in a standby state of reception, and cannot request the communication to other devices for itself.

The P2P device is a device in which the master and the slave are logically coexist, and serves as the master to lead the communication cycle if an event of communication start is produced by the last user or due to the internal state change of the device. After the termination of the corresponding communication, the P2P device serves as the slave to be in the standby state of reception.

The dedicated sender is a device only for sending according to its hardware characteristics, and may be a remote controller.

The dedicated receiver is a device only for reception according to its hardware characteristics, and may be a product that is provided with an infrared-rays receiver and operated by a dry battery.

Figure 4:
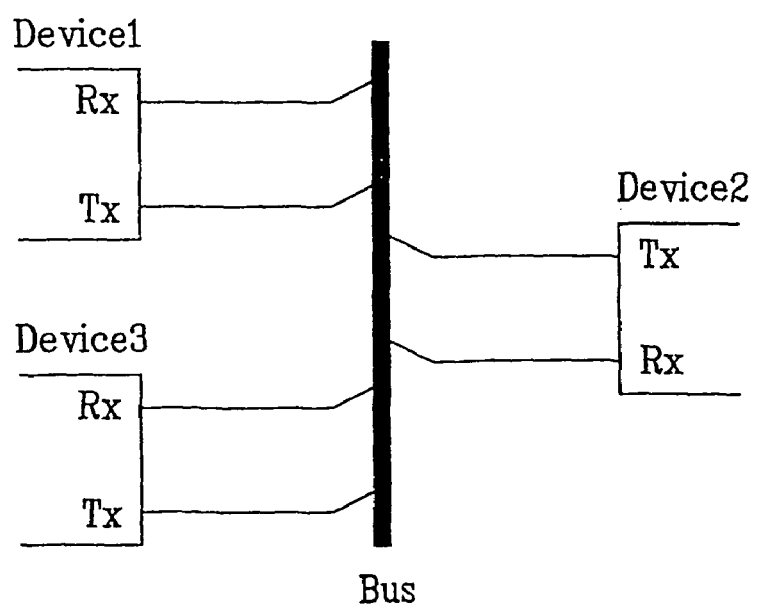
FIG. 4 is a view illustrating a half-duplex type communication structure according to the present invention.

As shown in FIG. 4, the network control system for home appliances according to the present invention performs a half-duplex type signal transmission using one bus.

Specifically, in case of transmission, the device does not receive data transmitted from other devices, and in case of reception, the device does not send data to other devices. This is for minimizing the memory use for the communication, and simultaneously for coping with the network that is constructed with one bus using the serial communication function such as the network for home appliances according to the present invention.

Accordingly, in case of the master or slave, the memory for all the transmission and reception can be shared, and in case of the P2P device, the memory for the transmission and reception can also be shared since the master and the slave do not simultaneously operate. Thus, it is not necessary to interrupt all the transmission/reception process, and this causes the degree of freedom for programming the function of the product to be heightened.

Next, the network control system for home appliances according to the present invention performs a one-cycle type communication. The one-cycle type is classified with a one-request/one-response type, one-request/multi-response type, and one request type.

Figure 5:
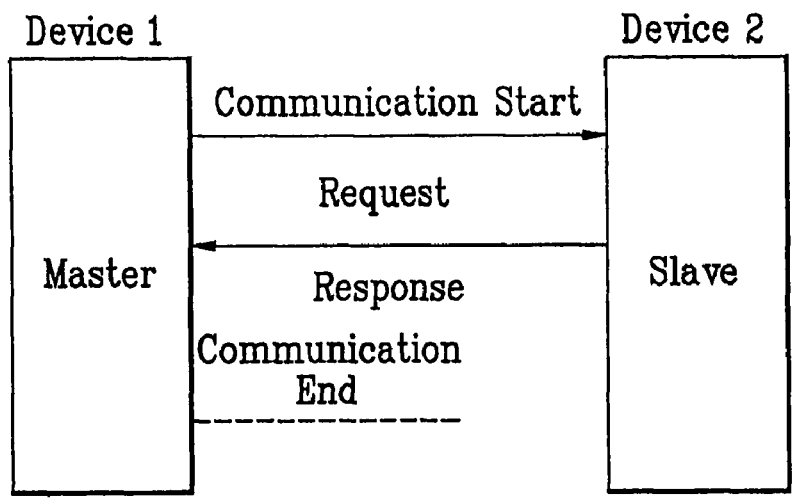
FIG. 5 is a view illustrating a one-request/one-response type communication cycle.
Figure 6:
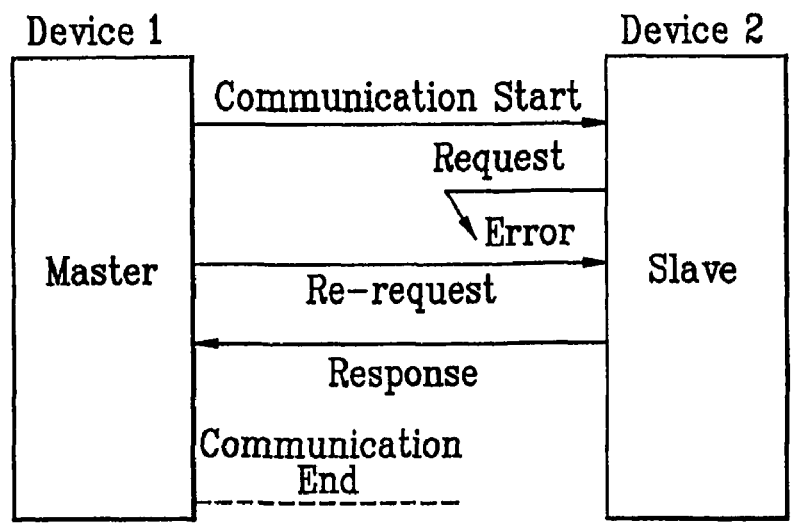
FIG. 6 is a view illustrating a communication cycle when a packet error is produced.
Figure 7:
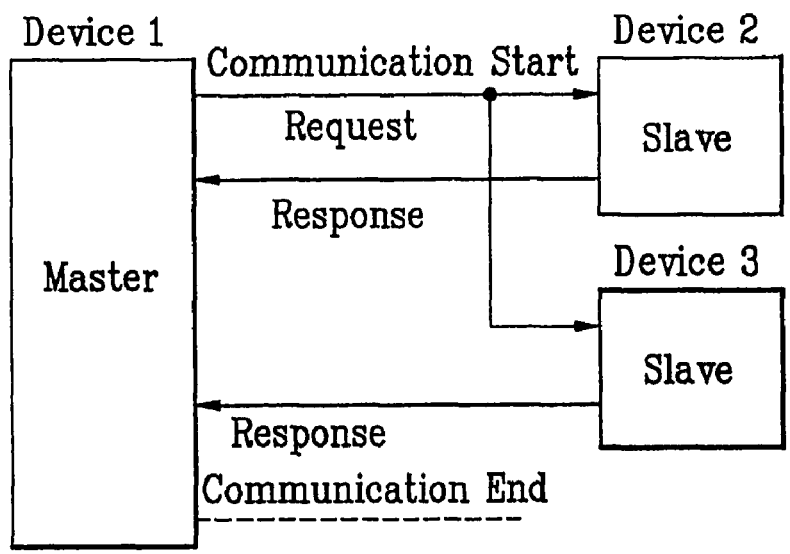
FIG. 7 is a view illustrating a one-request/multi-response type communication cycle.
Figure 8:
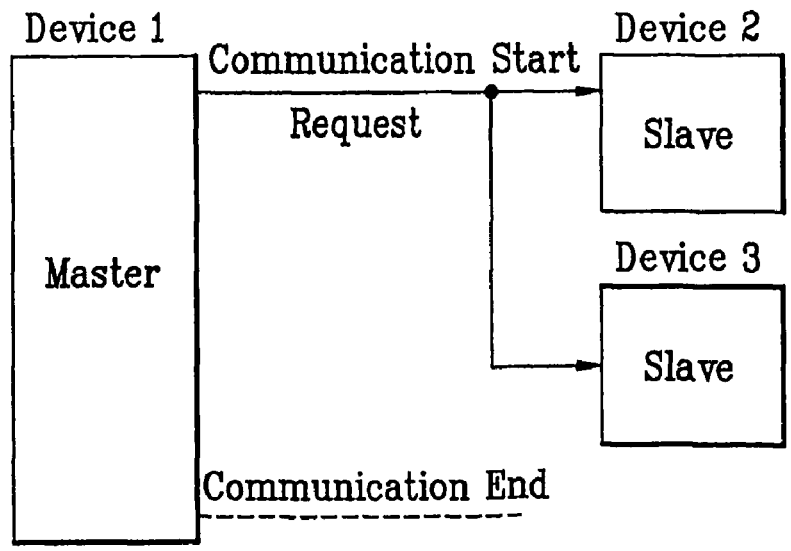
FIG. 8 is a view illustrating a one-request communication cycle.

At this time, as shown in FIG. 5, according to the one-request/one-response type communication, a master transmits one packet to a slave, and in response to this, the slave transmits one packet to the master to terminate the communication. As shown in FIG. 7, according to the one-request/multi-response type communication, a master transmits one packet to a plurality of slaves, and in response to this, the respective slaves transmit one packet to the master. The master waits for the response continuously, and if a predetermined maximum waiting time elapses, the master terminates the communication. Meanwhile, as shown in FIG. 8, according to the one request type communication, a master transmits one request with respect to a slave or a plurality of slaves, and then terminates the communication without waiting for the response. At this time, if data composed of several packets is transmitted, the master divides the data into packets having the size matching the corresponding slave, and transmits the data to the slave in the unit of a packet. FIG. 6 shows the communication type whereby if a response error is produced in the slave, the master retransmits the request, and receives the corresponding response to terminate the communication.

Next, the network control system for home appliances according to the present invention has a protocol composed of a physical layer, data link layer, and application layer.

In case of a TCP/IP protocol currently used as the Internet protocol, its communication layers are divided into an application layer, transport layer, network layer, data link layer, and physical layer. In case of the protocol for other home appliances or factory automation, it is basically provided with an application layer, data link layer, and physical layer, and additionally provided with a transport layer or network layer. However, since the present invention is for coping with the above-described communication types with respect to the home appliances of the low-performance specifications, it has the communication layer composed of the physical layer, data link layer, and application layer only. Also, according to the present invention, the physical layer and data link layer are simplified at maximum, and many portions for operating the product are assigned to the application layer in order to minimize the load of the microcomputer so as to match the master/slave type and the half-duplex type.

Figure 9:
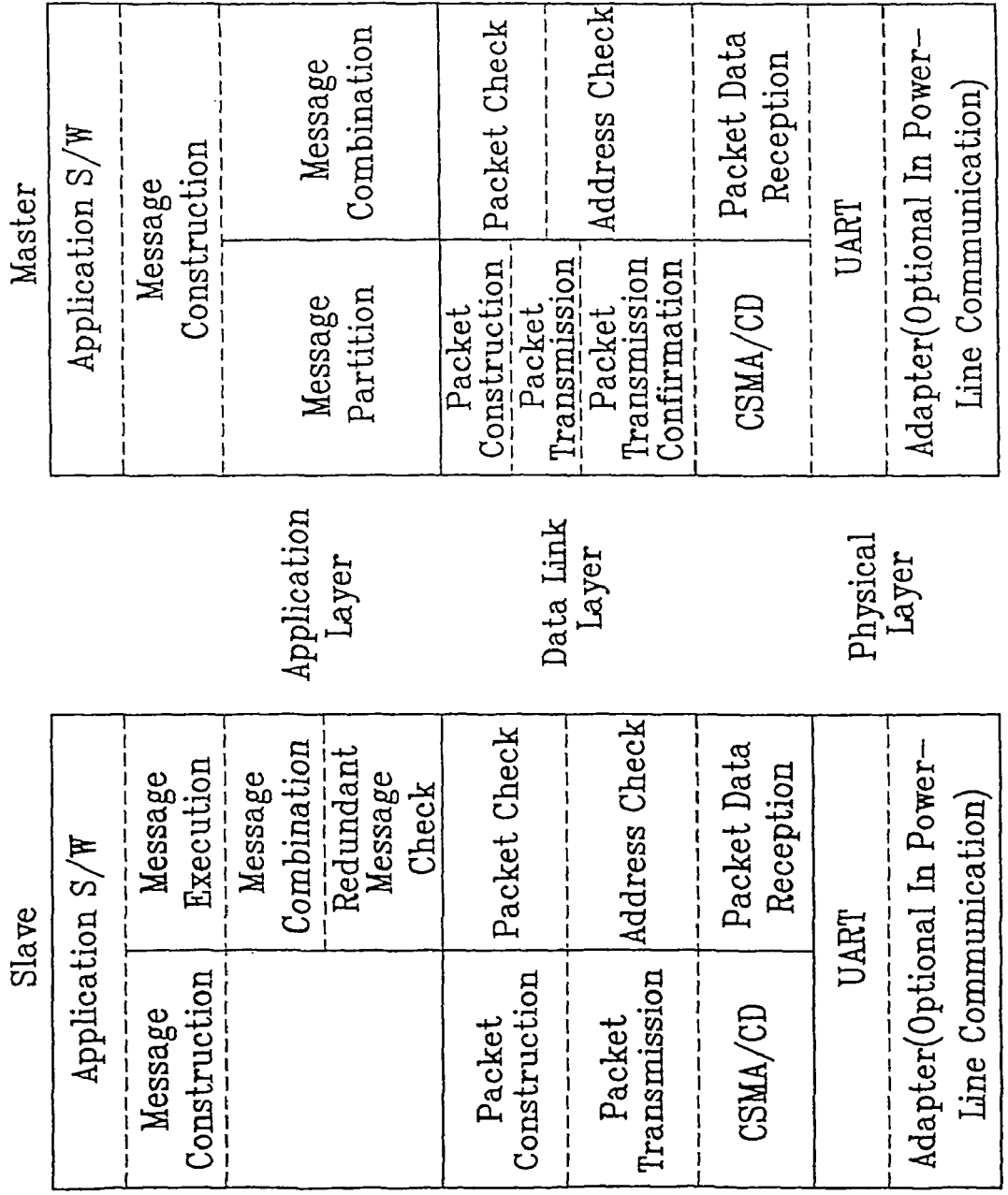
FIG. 9 is a view illustrating a division type of communication layers.

As shown in FIG. 9, in case of the slave, the communication layer comprises an application layer composed of regions of application software, message structure, message execution, message combination, and message redundancy check; data link layer composed of regions of packet structure, packet transmission, CSMA/CD, packet check, address check, and packet data reception; and physical layer composed of UART. At this time, the physical layer may include an adapter selected when a power-line communication is used.

In case of the master, the communication layer comprises an application layer composed of regions of application software, message division, and message combination; data link layer composed of regions of packet structure, confirmation of packet transmission, CSMA/CD, packet check, address check, and packet data reception; and physical layer composed of UART. The physical layer of the master may also include an adapter selected when a power-line communication is used.

At this time, the physical layer serves to receive bit signals on communication lines to construct the packet, or carry the packet received from the data link layer on the bit signal to transfer the bit signal through the communication lines.

The data link layer constructs the packet using data received from the application layer to send the packet to the physical layer, or processes the packet received from the physical layer to transfer the packet to the application layer. The role of the data link layer of the master is somewhat different from that of the slave. The data link layer of the master includes the process of securing the packet transmission to the physical layer. In the products serving as the slave, the physical layer and the data link layer have the same structure.

The application layer comprises message sets, and serves to analyze and process the message. In the products serving as the slave, the message includes a load control or memory control method, and the master serves to manage the slaves using results of the slaves' message processing or control the whole network. Accordingly, the application layer includes different contents for each product. The application layer of the master also serves as the transmission layer that divides the data into packets if the data to be transmitted is larger than one packet to transmit the divided packets, or combines and processes the divided packets if the divided packets are received. The reason why the transmission layer is not separated, but is included in the application layer is that the division and combination of the packets are performed only with respect to a specified message, not with respect to all the data.

Figure 10:
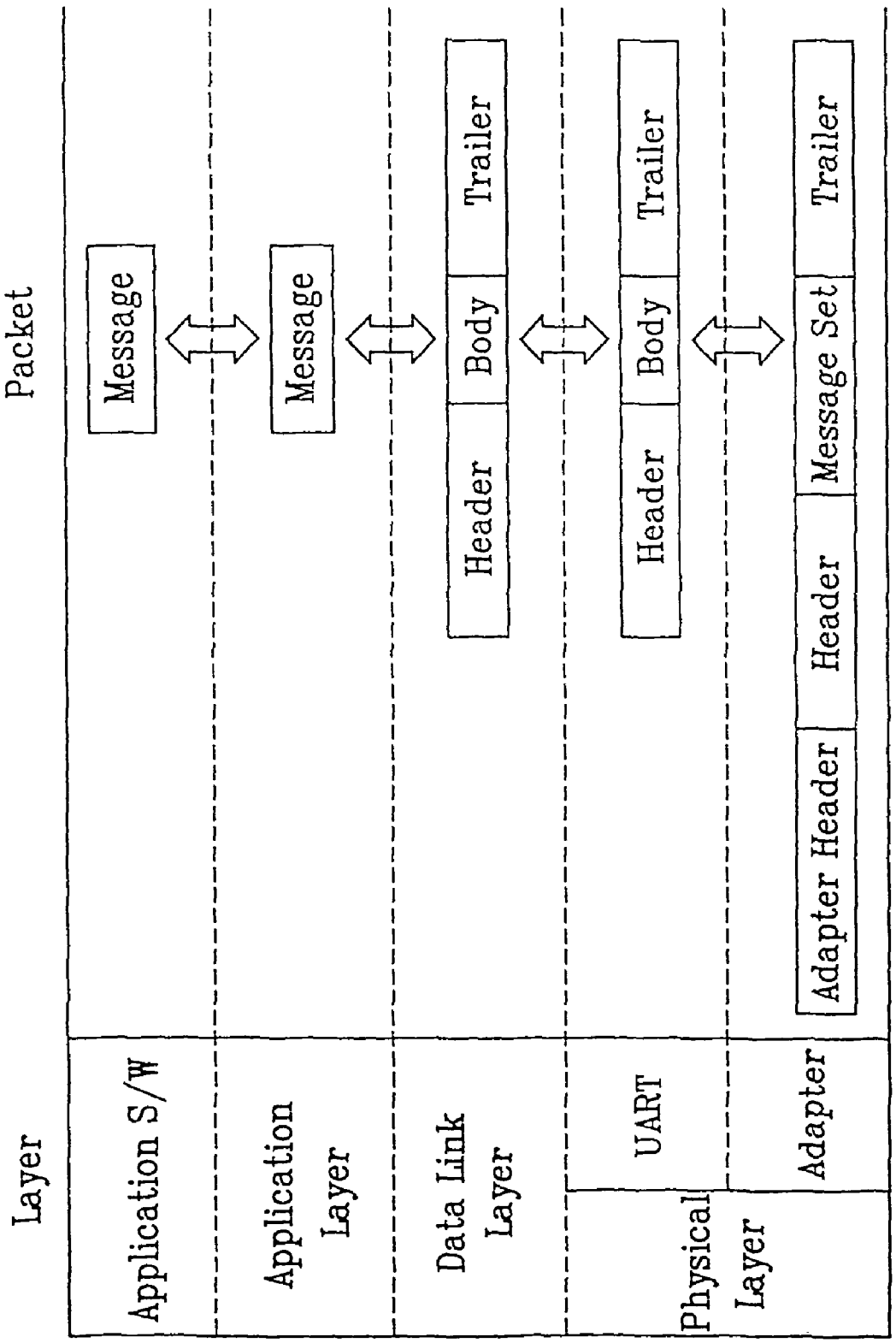
FIG. 10 is a view illustrating a packet communication structure among layers.

The packet communication structure between the communication layers is shown in FIG. 10. The interface between the application layer and the data link layer is performed in the unit of a message, while the interface between the data link layer and the physical layer is performed in the unit of a full packet. Between the data link layer and the physical layer, it is not required to separately construct the packets, but the communication is performed in the unit of the full packet so that the packets can be used as they are. However, since the length of a header added to the data link layer and the physical layer cannot not be known in the application layer, it is difficult to interface the data in the unit of a full packet, but the data is transferred from the application layer to the data link layer in the unit of a message. The packet should include all the information to be communicated, and have the structure to cope with the later extension of the communication function.

Figure 11:
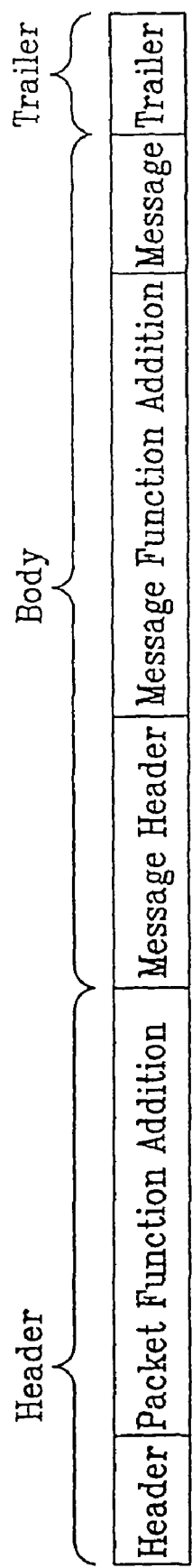
FIG. 11 is a view illustrating the whole packet structure.

The packet, as shown in FIG. 11, basically comprises a header region composed of a packet header field and field for later addition of the packet function; body region composed of a message header field, field for later addition of the packet function, and message field; and a trailer region.

Figure 12:
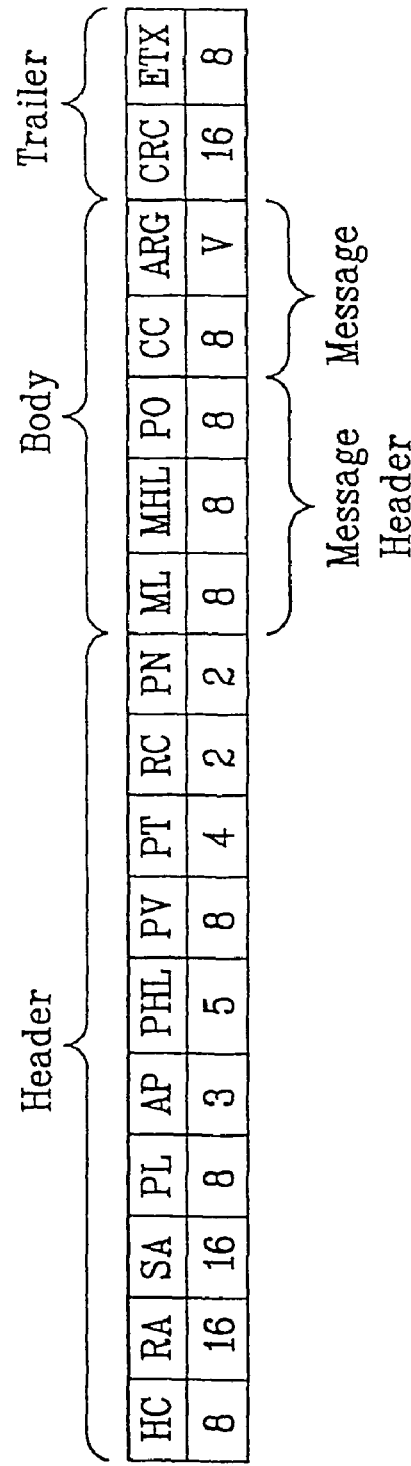
FIG. 12 is a view illustrating a request/notification packet.

Also, as shown in FIG. 12, the request/notification packet used in the master is composed of 17 bytes at minimum, and 255 bytes at maximum, and comprises a home code (HC) composed of 8 bit for classifying a home where the network is constructed, receiver address (RA) composed of 16 bits for indicating the receiver, sender address (SA) composed of 16 bits for indicating the sender, packet length (PL) composed of 8 bits for indicating the length of the packet, access priority (AP) composed of 3 bits for indicating a priority of transmission, packet header length (PHL) composed of 5 bits for indicating the length of the packet header, protocol version (PV) composed of 8 bits for indicating the version of the protocol, packet type (PT) composed of 4 bits for indicating the type of the packet, retransmission counter (RC) composed of 2 bits for indicating the number of retransmission, packet number (PN) composed of 2 bits for indicating the transmission of a new packet, message length (ML) composed of 8 bits, message header length (MHL) composed of 8 bits, port number (PO) composed of 8 bits, command code (CC) composed of 8 bits, argument (ARG) having the variable number of bits, cyclic redundancy check composed of 16 bits, and end of text (ETX) composed of 8 bits for indicating the end of the packet.

Figures 13, 14:
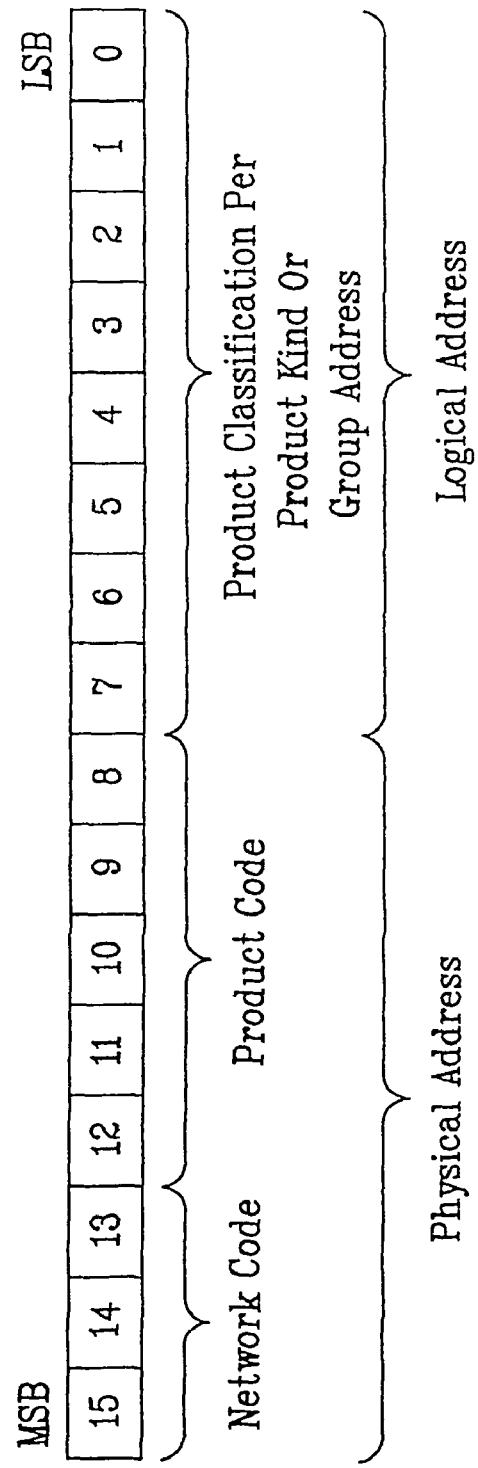
FIG. 13 is a view illustrating the structure of a response packet.
FIG. 14 is a view illustrating an address structure.

Also, as shown in FIG. 13, the response packet used in the slave is identical with the request/notification packet except that its body region includes an ACK/NAK of 8 bits.

At this time, the home code (HC) is a code for logically classifying the home where the network is constructed. Especially, in case that the transmission lines among the respective homes, such as the power lines, are not classified, hexadic values in the range of 0x03~0xFE are used for classifying the respective homes.

The receiver address (RA) located in front of the sender address (SA) is for early judging whether the receiver continuously receives the packet or ignores it when the packet is received. The upper 2 bits are for indicating the kind of the network, and the following 6 bits are for classifying the products having an independent function such as a washing machine, refrigerator, etc. The lower 8 bits are allocated to classify the product in case that several products of the same kind exist.

The packet length (PL) is composed of 1 byte for storing a number that indicates the packet length calculated in the unit of a byte from the home code to ETX of the packet. After receiving the packet length (PL) data value, the receiver receives only the data as much as the packet length data value, and performs the subsequent processes. Accordingly, the packet length (PL) value is used for identifying in advance the size of a receiving buffer, and for detecting an error of the received packet data. That is, the last byte of the packet is read out, and if it is not ETX, it is judged as the packet error.

The access priority (AP) is a field for indicating a transmission priority given to the message such as an urgent message, packet to be retransmitted due to the failure of transmission, or message that is less important than a general communication message, so that the physical layer can perform the CSMA/CD function according to the given priority. This field is significant if the adapter that performs the CSMA/CD function can transmit the message according to the transmission priority, and otherwise, it is ignored. The access priority values according to the respective communications are as follows.

0: in case of the retransmission due to the collision or in a state of emergency 1: in case of the mass transmission of data through the message division 2: in case of a normal communication 3: in case that the network connection state is reported (also in case of the collision, the priority is maintained 3.)

The packet header length (PHL) is a field for the extension of the packet header. If an extension field is added to the present packet header, and the packet header length is changed accordingly. In case of no change, it is of 9 bytes, and can be extended to 32 bytes at maximum.

The protocol version (PV) is 1-byte field that indicates the version of the adopted protocol. The version and subversion take the values of 0~15 in the order of their updating.

The packet type (PT) is composed of 4 bits determined when the packet is transmitted, and divided into a request packet, response packet, and notification packet. The response packet is further divided into a successful response and failed response. The master determines the request packet, and the slave determines the response packet. If the device operates only as the slave, it processes the request packet only. The reason why the response packet is divided into the two response types is that the packet is not transmitted to the application layer, but is immediately retransmitted if the packet type (PT) field in the packet header indicates the failed response even though the contents of the message is not known in the data link layer. A notification packet represents the packet that does not request the response. An arrayed packet is used for dividing and sending all the data without any response to the respective packet when the mass data file is transmitted at a high transmission speed, and its hexadic values are as follows.

0: Request packet
1~3: Reserved
4: Successful response packet
5: Failed response packet
6~7: Reserved
8: Broadcast notification packet
9: Arrayed packet
10: End packet of arrayed data
11~15: Reserved The retransmission count (RC) is a 2-bit field for preventing the duplicate process of the same message when the communication error is produced. If a CRC error is included in the received response packet, the received packet includes the CRC error, or the reception byte time is over, the master can retransmit the packet three times at maximum, while the slave can transmit only once.

The packet number (PN) is also a 2-bit field for preventing the duplicate process of the same message when the communication error is produced. The master increase the packet number by 1 whenever a new packet is transmitted, and in case of the retransmission of the same packet, the master maintains the previous packet number. Accordingly, the slave stores the packet number and transmission address of the previous message, and if the same message is received again, it ignores the duplicate message. If the received message is different from the previous message, the slave processes the message. The slave copies the packet number of the received message and constructs the response packet when the slave responds to the received message.

The message length (ML) is information for identifying the length of the message field since the length of the message field is variable. Accordingly, the application layer identifies the length of the message field by means of the message length.

The message header length (MHL) is a field for extending the message field later, and may include in addition a message header in case of encoding the message field, changing the application protocol, etc.

The port number (PO) is a field for extending the message set, and the message set may be classified for each port. For the version-up of the message set, or the compatibility with other application protocols, the message set may be placed in each port.

The message comprises a command code for the master's requesting of the function performance to the slave, input factors required for performing the command, and factors transmitted to the master after the slave performs the command. Also, the message should be constructed and defined to facilitate the programming in the 8-bit microcomputer. Specifically, even if the message is corrected, it should be module-programmed so that the correction of the message can be easily reflected. For this, all the messages have independent functions, respectively. This means that all the messages do not include any corresponding low-ranking message, and no causal relation among the respective routines in the software implementation. If the messages have independent functions from one another, the functions for controlling and monitoring the product can be extended through the combination of the messages. If the slave has normally performed the command, the factors transmitted to the master are {ACK+Return arguments}, and otherwise, the factors are {NAK+Error code}. 256 commands at maximum can be included in each device. The existence/nonexistence and the number of bytes of input arguments and return arguments are determined according to the command code.

At this time, the data types of the arguments are as follows.
boolean: 1 byte
char, unsigned char: 1 byte
int, unsigned int, short int, unsigned short int: 2 bytes
long, unsigned long: 4 bytes
string: transmission/reception with NULL included Also, in order to classify the command code, the following concept is put.

Though all product independently use 256 command codes in the range of 0x00~0xFF, common codes are used as commands commonly used in all the products. The correction of the terms is facilitated through the inclusion of the function of the product in the generalized structure. All the command codes are classified into essential command codes and optional command codes. The essential commands are the commands for the basic information of the device and commands required for the communication. They are classified into temporary commands (indicated as I) and program commands (indicated as P). The temporary command can be immediately performed when the slave receives it, and the program command requires a sequence for performing the command. Command codes in an algorithm area are not designated by the standardized codes for all the products. Since the products of the same kind can communicate with one another using different algorithms in accordance with their model numbers or their makers, they can perform the different functions using the same command code. Accordingly, all the command codes of this area should be allocated with inherent numbers of the product models, and included as the factors. Also, the message structure when the master transmits the message with the protocol for processing the message in the application layer is different from that when the slave responds to the master. When transmitted from the master, the message is composed of a command code and input factors for performing the command code, i.e., arguments (ARG). The number and data type of the factors become different according to the command code. The structure of the message transmitted by the slave that received one packet from the master is divided into one having an error and the other having no error when the packet error or command code received from the master is performed. If the packet received from the master has no error, and the command code is normally performed, the message structure is composed of a command code, ACK, and factors (ARG) resulted from the command coded performance. The number of resultant factors and data type are different according to the command code. If an error is produced in the packet received from the master, the message is composed of a command code, NAK, and packet error code. If the packet is normal, but an error is produced during the performance of the command code, the message is composed of a command code, NAK, and error code.

The CRC is a value for detecting an error of the received packet or making the receiver detect the packet error during the transmission. The CRC is composed of 16 bits, and its value is created or an error is detected using the data from ETX to the byte just before the CRC field.

The ETX(0x03) is a communication letter that means the end of the packet, and provides a method of detecting the packet error without using the CRC along with the packet length field during the reception. That is, when the byte data as long as the packet length is received, it can be judged to be the packet error if the last byte is not ETX. At this time, the packet error check using the CRC can be omitted.

The address of the above-described packet structure will now be explained in detail.

Each master or slave on the network is recognized as an address. The respective system has an allocated address of 2 bytes, and can transmit the packet to the corresponding opposite party through the allocated address. As shown in FIG. 14, the address is divided into a physical address which is composed of a network code of 3 bits and product code of 5 bits and is fixed unchangeable when the product is sent out, and logical address of 8 bits which is used for classifying the products of the same kind or as a group address, and is changeable through the communication and so on.

The network at home can be briefly classified into a PC group, A/V group, and living group, i.e., home appliance group, and a 3-bit network code is used for this classification. Even if the home appliance network is different from other sub-networks at home in communication protocol, the network classification field is necessary for the communication with the PC group or A/V group products. An example of the network code classification is shown in FIG. 15.

According to the network code, 5 bits are allocated for a product code, i.e., product name (for example, washing machine, refrigerator, health product, lamp, security product, etc.), and 8 bits are allocated for classifying the products of the same kind. This is in consideration of the condition of an inn, hotel, etc.

The 8-bit field for classifying the products of the same kind is also used as a group address that is classified according to the installed place of the product. A user inputs the installed place of the product when the network manager registers the product on the network.

At this time, the product group is determined in two ways. According to the first group address, all objects corresponding to the lower field can be determined by filling values of respective fields with '1', respectively. At this time, the group means the products that belong to the same kind or same network. For example, if the network code value is '111', it indicates all the networks at home, and if the product code value is '11111', it indicates all the products of the corresponding network. As shown in FIG. 16, the product group of a specified kind is selected according to the group address, and if the group address value is '11111111', it indicates all the products of the corresponding network and product code. According to the second group address, as shown in FIG. 17, is selected the product group of a specified place. At this time, the product code become '11111' to designate all the products, and the logical address value is designated according to the installed place. If the network code is '111', and the product code is '11111', the logical address field indicates the place code. Also, as shown in FIG. 18, a specified product group located in a specified place can be selected by designating the group address.

Next, a plug and play process, whereby the devices are connected through the network, initial home codes and addresses allocated to the devices, and the communication environment is determined, will be explained.

In order for the devices connected through the network to communicate with one another, all the devices are determined to have the same communication speed, and their unique addresses are allocated in the physical network. At this time, the master should be provided with a database of the names and addresses of all the devices. Also, in case that the transmission lines among the respective homes are not classified like the power lines, the respective homes should be classified. For this, the network manager that is in charge of the plug and play process determines home codes for classifying the respective homes when the power is initially supplied. After the home codes are determined, the network manager receives the input of the information on the device from the user when the device is firstly connected on the network, and performs a discovery and addressing process for allocating an address to the corresponding device. After completion of this process, a pre-request process for changing product information such as the model number or controller version of the device subject to communication, the size of a buffer for the packet construction, or the communication speed is performed. This pre-request process is not always necessary, but is performed as needed. The product information is necessary for identifying the name of the connected product, and the request for the buffer size is performed when the size of the packet is determined in order for the master to send a mass of data to the slave. The master requests the speed change to the slave when the mass data is transmitted/received, or the transmission/reception of the data is terminated. After the termination of the pre-request process, a general communication mode is performed. In view of the user's position, the plug and play process should be immediately performed when the power is inputted to the device without any user's additional installation or input work. However, after the device is connected on the network, the information on the device is inputted to the network manager, considering that the power lines are used as the network media. In case of the power lines, the transmission lines among the neighbors are not classified. Thus, if the network manager is also installed in the neighboring house in a state that the device is connected on the network, the network manager in the neighboring house may allocate the address to the device. To solve this problem, the network manager first requests registration of the address to the device in a manner that the device inputs the device information to the network manager.

According to the above-described home code determining process, the network manager, at the initial power input stage, transmits a home code confirming message to all the devices in order to determine the inherent home codes for discriminating the respective homes. At this time, the factor is the value produced as a certain home code within the range of 0x00~0xFF. If no response is received, the network manager determines the corresponding home code as its own home code since the home code is a unique value in the physical network where the network manager is connected. If the response is received, it means that the corresponding home code is not the unique value, and the network manager produces again a certain home code to repeat the above process. Since the above-described home codes are determined simultaneously with respect to the respective products when the network manager decides the addresses of the respective products, the same home code is given to the products in the same home, enabling the respective homes to be classified.

However, the address-related information including the home code is stored in a non-volatile memory of the respective product, and thus it may become an issue if the user changes his/her residence after the address allocation of the respective products. Specifically, if any other home connected on the same physical network as the moving-out home uses the same home code, the respective homes cannot be classified due to the home code collision. Accordingly, in case of moving, the home code collision should be repeatedly confirmed at an initial home code determination by inputting the power only to the network manager in a state that the power supplied to all the products is cut off. If no collision occurs, they can be used as they are without the home code change, while if the collision occurs, the home codes of all the products should be reset, and then re-determined. At this time, in order to discriminate the home products whose home codes are in collision, a user ID is used as a factor. The user ID is inputted through the network manager when the device is first connected on the network.

Next, in the discovery and addressing process, the user inputs to the network manager that can manage the network the product name, number of products, installed place, and user ID of the device to which the power is supplied when the device is initially connected on the network. Then, the network manager requests the registration of the device initially connected on the network, and allocates the address if a temporary address registration message is received from the device. At this time, even if a plurality of products of the same kind exist, the network manager designates new addresses to the respective products to prevent any address collision. The reason why the number of products is inputted is that when several products of the same kind are simultaneously connected on the network, it is required that the network manager recognizes whether the registration messages are received from all the connected products. Also, the reason why the installed place is inputted is that the user can easily identify the product through the position information of the product that appears on the screen of the network manager. The user ID is for confirming the product during the home code reset as described above. The address of the network manager is fixed to 0x00 irrespective of the on/off state of the power. However, other devices, which may be masters or slaves, have representative product addresses given during their sending out when the power is off. The network manager determines a region of extra addresses which can be selected by the products using a command called 'join request', and requests the devices (i.e., designated as the representative product addresses) whose addresses are not designated through the user's input to register with the temporary addresses. In case of an air conditioner, 0x20 is selected as the receiver's number, and the extra address has the factor in the range of 0x21~0x2E. The 'join request' command can recognize only the product whose address is not decided. The called products determine their addresses (i.e., temporary addresses) by optionally selecting the extra addresses by operating a random-number generator, and inform their address values to the network manager. If 0x25 is selected from 0x21~0x2E, it is transmitted to the network manager. The temporary address acts as the address of the corresponding product until the network manager or master changes it using an 'address change' command, or the power supply to the product is turned off. The network manager resets the duplicate addresses of the products to the representative addresses, respectively, using the 'address change' command, and decides the addresses of the products having the temporary addresses not duplicated in the order of the extra addresses to re-call the corresponding products. At this time, the network manager determines the home codes of the corresponding products and the user ID by transmitting both its own home code and the user ID inputted by the user. If the temporary address not duplicated are 0x2A, 0x25, and 0x23, and the extra addresses are in the range of 0x21~0x2E, the addresses of the products having the temporary addresses 0x23, 0x25, and 0x2A are decided to be 0x21, 0x252, and 0x23, respectively. If any duplicate temporary address exists, the above process is repeated. The above-described discovery and addressing process is repeated 14 times with respect to all the kinds of products (i.e., 0x01~0x0F).

As described above, after completion of the discovery and addressing process, the names, addresses, and installed places of the devices have been stored in the database of the network manager. The devices connected to the network manager start for the first time to operate as the masters or slaves after their addresses are completely designated by the network manager. At this time, the devices acting as the master read out the names and addresses of the devices from the database of the network manager to store them in its own memory, and start to communicate with the slaves. Before the address allocation, all the devices cannot but act as the slaves. The devices allocated with their addresses periodically broadcast a message for informing their existence because the masters that can control the respective devices should know whether the devices are connected on the network. If the connected devices and disconnected devices are not discriminated, it becomes difficult to find out whether the communication impossibility is caused by the power-off or the trouble of the device. Also, the disconnected devices are displayed in an inactive state on the screen of the network manager to be informed to the user. All the devices allocated with the addresses periodically broadcast alive messages to inform their existence, and at this time, it is necessary to adjust the period. If the number of devices is small, it does not matter, but if the number of devices is large, too short period causes too many alive messages to be transmitted, thereby deteriorating the performance of the network. The initial period is determined to be long, and then adjusted in proportion to the number of devices. That is, if the number of devices is small, the period is determined to be short, while the number of devices is large, the period is determined to be long, and this causes the performance of the network to be maintained. At this time, the network manager determines the period, and the respective device broadcasts its own period as the factor of the alive message. The network manager receives the alive message of the respective device, and if the received alive message is different from the period determined by the network manager, the network manager determines the period of the corresponding device as its own period.

Next, the event that produces the communication conditions of the device will be explained.

The event means the case that a certain state change is produced in the device, and can be classified into the following 5 types according to the production sources. They are a user event that is produced when the user directly commands the device through a key, periodic event that is automatically produced at predetermined intervals (for example, an alive notification message transmitted from the network manager for a predetermined period), status event that is produced due to the voluntary state change of the device during monitoring of the system state (for example, change of temperature, humidity, washing cycle, etc.), error event that is produced when an error related to the operation of the system occurs, and external event that is produced when requested from the outside of the system such as a web server and so on (for example, a communication request from a remote place when the network manager serves as a home server).

A device provided with a user interface such as a keyboard, mouse, and monitor can perform a peer-to-peer communication with all the devices by all the 5 events. However, in order for the device that is short of user interface to perform the peer-to-peer communication, the condition for effecting the communication should be determined in advance, or the peer-to-peer communication is possible only by the events produced due to the internal factors of the device.

According to the present invention, if an event is produced, the corresponding device performs the communication by informing its own state change to all the devices using a notification packet. The reason why the event has an important meaning is that in case that the user monitors the state of the device, it is much more effective that the device informs its state change for itself than that the user requests the state value of the device every time when he/she desires to know the state of the device. Also, since the trouble of the device or error occurrence should be immediately informed as soon as it occurs, the process of immediately informing the state change when the event is produced is necessary.

The event implemented by the respective device is represented by an event code of 1 byte, and is divided into a common event commonly implemented in all the devices and a private event implemented for each product. As the code classification, an area classification rather than a field classification is used since the number of codes that may be added later is different for each term.

The common event may be further divided into an event region related to the user's manipulation, and error event region that is common to all the devices. The event related to the user's manipulation may be a key or dial input, door opening/closing, load input, etc., and has an event code value of 0x11~0x2F. The common event may be door opening during operation and so on, and has an event code value of 0x30~0x4F. The private event may be classified into an error event for each product, and a status event for each product. The error event for each product represents an inherent error state or trouble state of each product, and has an event code value of 0x70~0xAF. The operation status event is an event produced whenever the status of the product is changed during the operation of the product, and has an event code value of 0xB0~0xFF.

The event code may be classified into an essential event code that is essentially implemented by all the devices (for example, a trouble event code) and an optional event code that is optionally implemented by the devices. The essential event code makes the state change to be broadcast as the notification packet when the event is produced, so that another device can monitor the state change. At this time, the used command code is the notification command, and has an event code of 1 byte and event code state value of 4 bytes as the factors. If an event is produced in a device, it may be informed simply by broadcasting the notification packet, but it commands an operation of another device. For example, when the washing cycle of the washing machine is terminated, it commands a lamp of a veranda to be turned on, or it commands an air conditioner to display a text message. For this, each device should store information on an address, operation command code, and factors of the device subject to communication whenever the event code is produced. However, since such information is different according to the users' tastes, the communication condition when the event is produced in the respective device should be determined through the network manager. At this time, in case of not only commanding the operation of another device but also broadcasting the event, the user should determined the options. Another one to be considered when the event communication condition is determined is a time interval for informing the event. If the temperature state or sensor state where the event communication is determined is rapidly changed, the performance of the network may deteriorate due to too many event communication packets, and thus a minimum event producing interval is necessary. Accordingly, when the user determines the communication condition for the produced event through the network manager, he/she should determine the event code, device subject to communication, minimum interval of event production, communication message, etc.

The event communication condition is stored in the non-volatile memory of the respective device as an event file composed of a header of FIG. 19 and body of FIG. 20. The user can re-determine the event communication condition through the network manager. In case of an initial determination, the user determines the event communication condition after confirming whether the size of the non-volatile memory of the device is enough through a buffer size read command. Also, since the size of the non-volatile memory is limited, the information on an unnecessary event communication condition should be deleted. A message for this purpose also exists, and the user can delete the unnecessary event communication condition using this message (i.e., an event code delete command code).

In order to perform the event code, the total number of events (total_event_no) to be executed and the event codes are read out from the header of the event file stored in the non-volatile memory. If the state of the defined variable is changed during the operation, a system main program stores this information in the corresponding memory. An event code executing routine judges whether to execute by comparing the system state value with the event code read out from the event file. In order to prevent the resources of the microcomputer from being occupied due to the continuous execution of the event code when the various states of the system are simultaneously changed, the event code executing routine executes one event code at a time.

Next, a method of controlling various kinds of errors will be explained.

The communication error is classified into a data bit error due to a noise of the communication lines, error caused by the different communication frequencies, data bit error due to the data collision, error caused by the transmitted signal attenuation when impedances between the lines and devices do not match, and error caused by transmission/reception of data that cannot be processed by the receiving device though no data bit error is produced. The noise of the communication lines causes a frame error of the physical layer of the receiving side, i.e., UART frame error, or serves to change the data value. If the communication frequencies of the sending/receiving devices are different, the UART frame error is mostly produced in the receiving side. When several devices transmit simultaneously, the UART frame error is mostly produced in the receiving side. When the impedances between the lines and devices do not match, no signal is received in the receiving side.

If the master transmits the request packet to the slave, the slave receives the packet, and detects the defined errors. If the slave detects the error from the received data bits, the slave transmits to the master a response packet including the code value of the error detected in the sending side as shown in FIG. 21, and the master performs the retransmission or error-processing function according to the error code.

At this time, the error code is composed of 1 byte, and is divided into a common error code allocated to the region of 0x00~0x9F commonly used by all the devices, and a trouble code allocated to the region of 0xA0~0xFF independently used by the devices. The common error code indicates values of the communication error, and the trouble code indicates values for diagnosing the trouble of the inherent functions of the device such as the sensor, being separated from the communication function. Each device has 96 codes, which is classified into packet error, receiver error, bad command, illegal arguments, illegal access, and trouble codes. The details thereof are as follows.

First, the packet error is divided into a CRC error of the received packet, receiving time over of 1 byte, and response waiting time over.

The CRC error of the received packet is produced when the CRC value included in the received packet of both the master and the slave is different from the calculated CRC value. If the CRC error is produced in the response packet received in the slave, the slave transmits the response packet including the CRC error value to the master. If the master received the response packet, the retransmission of the packet is repeated three times at maximum.

The 1-byte receiving time over error is produced when the time interval between the received bytes deviates from 2 BTU (i.e., minimum time 3 msec: 9600 bps basis) due to the noise or other reasons on the communication lines. However, at this time, even the packet length field should be received in the receiving side. If the byte time interval becomes larger than a predetermined value before the packet length field is received, the received data is ignored. If 1-byte receiving time over error is produced, the receiver stops the reception, fills the remaining region of the packet-receiving buffer with 0, and transfers the packet to the upper layer. As a result, the CRC error is produced in the receiver. If an error is produced in the slave due to the noise of the lines when the master transmits the request packet to the slave, the response packet including the CRC error is transmitted to the master. If the master normally received the response packet, the packet is retransmitted three times at maximum. If the 1-byte receiving timer over error is produced in the master even though the slave normally received the request packet and transmitted a normal response packet, the master retransmits the packet three times at maximum. Even though the byte receiving time over error may be produced in both the master and slave, the error code is necessary among the respective communication layers only, and the information on the 1-byte receiving time over error is not given to the sender. That is, the byte receiving time error is a value for the process inside the device, and is not transferred between the master and the slave. The time limit of the receiving time over is related to the busy check. According to the present invention, since the transmission/reception is performed in the unit of a packet, the time interval of the byte transmission should be shortened in order to inform the bus occupation during the busy check by another device. If the time limit of the receiving time over is large, the time delay may occur during the transmission of one packet. At this time, another device attempting at transmission may judge the present state to be in an idle state during the busy check, and immediately start the transmission, causing the data collision to occur.

The response waiting time over error is produced when no data is received after the master transmitted the request packet. That is, it is produced when no slave subject to communication exists. The physical layer of the master waits for 5 seconds at maximum, and if no data is received, it prepares and sends to the data link layer a packet including a response waiting timer over code. The data link layer sends a message to the application layer, and thus the application layer recognizes that the corresponding device does not exist.

Next, the receiver error is divided into a lack of memory, rejection of communication, refusal of remote control, non-match of protocol version, and non-match of message ports.

The lack-of-memory error is produced if the slave has no spare memory for writing the received data when the master transmits to the slave a command code such as a memory write, LCD write, EEPROM write, etc.

The communication rejection error is produced when the slave intends to preferentially perform another function other than the communication even though it normally received the request packet from the master. The master that received the communication rejection error can attempt again after 5 seconds (i.e., maximum waiting time of the master) at minimum.

The remote control refusal error is produced when the slave receives a control command message in a state that the remote control of the slave is not possible.

Next, a bad command is divided into a command code that cannot be performed and factor values that cannot be performed.

The command code error that cannot be performed is produced in case that the slave normally received the request packet, but the request packet includes a command code that cannot be performed by the slave.

The factor value error that cannot be performed is produced in case that the command code that can be performed is received and the factors are determined within a defined range, but the value cannot be performed by the device. For example, in case of a load on/off command of a microwave oven, if input value relates to a hood fan but the microwave oven has no hood fan, the factor value error that cannot be performed is produced.

Next, the illegal arguments are divided into a factor number error that is different from the defined number, and over range error.

The factor number error that is different from the defined number is produced in case that the slave normally received the request packet from the master, but the number of input factors for performing the command code is different from the number defined in the message set. At this time, the number of factors is the number of bytes. If the input factor is a variable defined as an "unsigned int", the number of input factors becomes 2 since each factor is composed of 2 bytes.

The over range error is produced in case that the slave normally received the request packet from the master, but the input factor value for performing the command code deviates from a range defined in the message set.

Next, the illegal access error caused by detection of a prohibited action is produced in case that the slave normally received the request packet from the master, but the input factor value for performing the command code designates a prohibited memory region or a load whose control is prohibited.

Next, the trouble code will be explained.

All the devices have their inherent functions besides the communication, and any trouble of such functions can be remotely diagnosed. When the function of the device is in trouble, the trouble code is included in the response packet to be sent to the master. For example, if a temperature sensor is judged to be in trouble when the slave receives the response packet including the command code for reading the value from the temperature sensor, the slave includes the trouble code value of the temperature sensor in the response packet along with 'NAK' to transmit the response packet including the trouble code to the master. All the devices determine the value of the trouble code using the common region.

If the data bits constituting the packet are in trouble, i.e., if the receiver address error, sender address error, sending/receiving address error, and packet length error are produced, the present invention processes them as the CRC errors. The detailed explanation thereof is as follows.

First, the receiver address error will be explained.

If an error is produced in the bits of the receiver address field, the device that is not called receives the packet. At this time, the device detects the CRC error due to the error in the bits of the receiver address field. First, if an error packet is transmitted from a master A to a slave A, and another slave B also receives the error packet, the slave B transmits a response packet including the CRC error value to the master A. The master A, which received the response packet from the slave B, ignores the sender's address, and considers that the originally called slave A responded although another device that is not the slave A responded. Specifically, the master considers one packet received after the master transmits one packet to be the response packet from the device that was called. The master A that received the response packet retransmits the packet to the slave A three times at maximum. Second, if another slave B receives the response packet transmitted to the master A by the slave A which received the request packet from the master A due to the error of the receiver address field, the slave B transmits the response packet including the CRC error to the slave A. At this time, if no packet error exists, the slave A can recognize the response packet from the packet kind field value, and thus ignores the received packet. The master A continuously waits for the response packet from the slave A for 10 seconds at maximum. After 10 seconds elapses, the communication starting from the request packet transmitted from the master A to the slave A is terminated without performing any command code through the slave.

Next, the sender address error will be explained.

If an error is produced in the bits of the sender address field, the device that is called by the sender receives the packet, and detects the CRC error due to the error in the bits of the sender address field. First, if an error is produced in the sender address field when the master A transmits the request packet to the slave A, the slave A that received the packet transmits the response packet to the device (i.e., master or slave) of the address value in the sender address field. If this response packet is transmitted without error, and another slave B received the response packet, the slave B can recognize the response packet from the packet kind field value, and thus ignores the received packet. If another master B receives this response packet, the master B ignores the received packet according to the 1-packet-transmission/1-packet-reception rule since it did not transmit the request packet. The master A waits for the response packet from the slave A for 10 seconds at maximum. After 10 seconds elapses, the slave does not perform any command code, and the communication is terminated. Second is the case that the master A normally transmitted the request packet to the slave A, and an error is produced in the sender address field of the response packet transmitted from the slave A to the master A. In this case, if the response packet was transmitted without error, and another slave B received the response packet, the slave B can recognize the response packet from the packet kind field value, and ignores the received packet. If another master B received this response packet, the master B ignores the received packet according to the 1-packet-transmission/1-packet-reception rule since it did not transmit the request packet. The master A waits for the response packet from the slave A for 10 seconds at maximum. After 10 seconds elapses, the slave does not perform any command code, and the communication is terminated.

Next, the sending/receiving address error will be explained.

If an error is produced in the bits of the receiver address field and the sender address field, another device that is not called by the sender receives the packet, but detects the CRC error. In this case, the communication between the devices is performed in the same sequence as the receiver address error and the sender address error, and then terminated.

At last, the packet length error will be explained.

The receiver constructs a received packet buffer using the number of bytes as much as the value of the packet length field. First, in case that the packet length field value is larger than the actual value, the receiver continuously waits for the data though the receiver received the actual packet. If no more byte is received, and the reception limit time between bytes elapses, the time over error is produced, and the receiver fills the remaining portion of the received packet buffer with certain data, causing the CRC error to be produced. Accordingly, the master retransmits the packet three times at maximum. Second, in case that the packet length field value is smaller than the actual value, the receiver also detects the CRC error.

INDUSTRIAL APPLICABILITY

As apparent from the above description, the network control system according to the present invention has the following effects.

First, according to the present invention, the network is constructed using the master/slave type, 1-cycle type, and half-duplex type communication system and the serial communication of a low-performance microcomputer used in home appliances with a simplified and standardized protocol, and thus a low-priced and optimized network for the home appliances can be implemented.

Second, according to the present invention, since the operation state change of one appliance among the home appliances connected on the network can be informed to the user through another appliance, and the communication condition and the appliance subject to the communication can be selected by the user, the user convenience can be maximized.

Third, according to the present invention, since the power lines can be used as the communication media, the network connection becomes possible by connecting the power plug of the home appliance to the outlet without any further manipulation.

The invention claimed is:

1. A network control system for home appliances provided with a low performance microcomputer of 8 bits or less having a serial communication function, the system comprising:

a master and slave type communication structure, wherein at least one appliance in the group of appliances includes either at least one of a master device or a slave device;

each master or slave device having a communication standard consisting of an application layer, data link layer, and physical layer;

a network that connects the appliances through the serial communication function, wherein the appliances communicate with one another in the unit of a specified packet according to the communication structure and communication standard if a predetermined communication event is produced, wherein the communication standard of the at least one master device includes:

an application layer having regions of application software, message construction and division, and message combination;

a data link layer having regions of packet structure, confirmation of packet transmission, CSMA/CD, packet check, address check, and packet data reception; and a physical layer having a UART, wherein, the each master device or slave device on the network is recognized as an address which is divided into a physical address which includes at least a product code field and is fixed unchangeable, and a logical address field which is changeable through a communication, and wherein the logical address is used for classifying the master device or slave device of the same kind or as a group address.

2. The network control system of claim 1, wherein at least one master device in the communication structure starts communication with a corresponding slave device if the predetermined communication event is produced, and ends the communication with the slave device if a predetermined communication condition is realized.

3. The network control system of claim 1, wherein a slave device in the communication structure is always in a standby state of reception, and is configured to communicate if the communication is requested from the at least one of the mater device.

4. The network control system of claim 1, wherein at least one apparatus includes a combined master/slave in the communication structure that serves as a master device to lead communication with a corresponding slave device if the predetermined communication event is produced, and serves as the slave to maintain the standby state of reception if the communication is terminated.

5. The network control system of claim 1, wherein the physical layer further comprises an adapter for a power-line communication.

6. The network control system of claim 1, wherein the at least one slave device of the communication structure has a communication standard comprising: an application layer having regions of application software, message construction, message execution, message combination, and message redundancy check; a data link layer having regions of packet construction, packet transmission, CSMA/CD, packet check, address check, and packet data reception; and a physical layer having an UART.

7. The network control system of claim 6, wherein the physical layer further comprises an adapter for a power-line communication.

8. The network control system of claim 1, wherein the communication event includes a user event, periodic event, status event, error event, and external event.

9. The network control system of claim 1, wherein if an error is detected from the packet transmitted from the at least one master device, the at least one slave device transmits a response packet including an error code to the corresponding master.

10. The network control system of claim 9, wherein the error code includes a packet error, receiver error, bad command, illegal arguments, illegal access, and trouble code.

11. A home network system comprising:

a master device; a slave device; an adapter; and a transmission medium connecting the master device, the slave device and the adapter, wherein the master device transmits a request to the slave device and monitors the state of the slave device, wherein the slave device transmits a response for the request to the master device and transmits a notification to the home network system, wherein the adapter connects the master device or the slave device to the transmission medium;

wherein the master device and the slave device communicate with each other, by a packet, through an application layer, a data link layer, and a physical layer, according to a predetermined communication protocol, the communication between the master device and the slave device initiated by a predetermined communication event, the communication event indicating a change of a state of the master device or the slave device, wherein the adapter communicates with the master device or the slave device by a serial communicating method using a UART (universal asynchronous receiver and transmitter) frame structure, wherein the application layer of the master device has a function for application software, message construction, message division and message combination, wherein the data link layer of master device has a function for packet structure, confirmation of packet transmission, collision management, packet check and packet data reception, wherein the physical layer of the master device has a UART, wherein the master device and the slave device have an address which comprises a physical address and a logical address, wherein the physical address includes a product code field and is fixed and unchangeable, wherein the logical address is changeable through a communication and is used for distinguishing the master device from a same kind of the master devices, distinguishing the slave device from a same kind of the slave devices or classifying the master device and/or the slave device into a group.

12. The home network system of claim 11, wherein the communication event includes a user event, periodic event, status event, error event, and external event.

13. The home network system of claim 11, wherein if an error is detected from the packet transmitted from the master device, the slave device transmits a response packet including an error code to the master device.

14. The home network system of claim 13, wherein the error code includes a packet error, receiver error, bad command, illegal arguments, illegal access, and trouble code.

* * * * *